United States Patent
Codella et al.

(10) Patent No.: US 9,002,069 B2
(45) Date of Patent: Apr. 7, 2015

(54) SOCIAL MEDIA EVENT DETECTION AND CONTENT-BASED RETRIEVAL

(71) Applicant: International Business Machines Corporation, Armonk, NY (US)

(72) Inventors: Noel C. Codella, Lagrangeville, NY (US); Apostol Natsev, Harrison, NY (US); John R. Smith, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 13/625,295

(22) Filed: Sep. 24, 2012

(65) Prior Publication Data

US 2014/0085329 A1    Mar. 27, 2014

Related U.S. Application Data

(63) Continuation of application No. 13/625,132, filed on Sep. 24, 2012.

(51) Int. Cl.
G06K 9/46 (2006.01)
G06F 17/30 (2006.01)

(52) U.S. Cl.
CPC ................................. G06F 17/30 (2013.01)

(58) Field of Classification Search
None
See application file for complete search history.

(56) References Cited

U.S. PATENT DOCUMENTS

| 7,873,638 | B2* | 1/2011 | Young et al. ............... 707/736 |
| 2005/0154637 | A1* | 7/2005 | Nair et al. ................. 705/14 |
| 2008/0133638 | A1* | 6/2008 | Fischer et al. ............. 709/201 |
| 2011/0040760 | A1 | 2/2011 | Fleischman et al. |
| 2011/0041080 | A1 | 2/2011 | Fleischman et al. |
| 2011/0082915 | A1* | 4/2011 | Carr et al. ................. 709/219 |
| 2011/0137845 | A1* | 6/2011 | Ward ........................ 706/50 |
| 2011/0276396 | A1* | 11/2011 | Rathod .................... 705/14.49 |
| 2012/0079020 | A1* | 3/2012 | Park et al. ................. 709/204 |
| 2012/0131047 | A1* | 5/2012 | Rajaraman et al. ......... 707/769 |
| 2012/0215903 | A1* | 8/2012 | Fleischman et al. ........ 709/224 |
| 2012/0323938 | A1* | 12/2012 | Skeen et al. ............... 707/754 |
| 2012/0328190 | A1* | 12/2012 | Bercovich et al. ........... 382/165 |
| 2013/0014158 | A1* | 1/2013 | Bhatia et al. ............... 725/34 |
| 2013/0014222 | A1* | 1/2013 | Bhatia et al. ............... 726/4 |
| 2013/0014223 | A1* | 1/2013 | Bhatia et al. ............... 726/4 |
| 2013/0046826 | A1* | 2/2013 | Stanton .................... 709/204 |
| 2013/0124653 | A1* | 5/2013 | Vick et al. ................. 709/206 |
| 2013/0297694 | A1* | 11/2013 | Ghosh ..................... 709/204 |

OTHER PUBLICATIONS

Sang et al., Faceted Subtopic Retrieval: Exploiting the Topic Hierarchy Via a Multi-Modal Framework, Journal of Multimedia, vol. 7, No. 1, 9-20, Feb. 2012.

(Continued)

Primary Examiner — Tsung-Yin Tsai
(74) Attorney, Agent, or Firm — Ryan, Mason & Lewis, LLP

(57) ABSTRACT

A system and article of manufacture for social media event detection and content-based retrieval include obtaining multiple images from at least one social media source, extracting at least one visual semantic concept from the multiple images, differentiating an event semantic concept signal from a background semantic concept signal to detect an event in the multiple images, and retrieving one or more images associated with the event semantic concept signal for presentation as a visual description of the detected event.

15 Claims, 5 Drawing Sheets

(56) References Cited

OTHER PUBLICATIONS

Sakaki et al., Earthquake Shakes Twitter Users: Real-time Event Detection by Social Sensors, WWW2010, Apr. 26-30, 2010.

Yom-Tov et al., Method and System for Improving Retrieval of Social Media Posts Based on Location and Frequency of Posting on Social Media, Dec. 8, 2011.

Anonymous, Identifying a Social Network User Identifier Based on a User Message, Jul. 26, 2010.

* cited by examiner

SOCIAL MEDIA EVENT DETECTION AND CONTENT-BASED RETRIEVAL

CROSS-REFERENCE TO RELATED APPLICATIONS

This application is a continuation of U.S. patent application Ser. No. 13/625,132 filed Sep. 24, 2012, and incorporated by reference herein.

FIELD OF THE INVENTION

Embodiments of the invention generally relate to information technology, and, more particularly, to social media technology.

BACKGROUND

Event detection over social media channels, in existing approaches, has been performed via text-based input (for example, text-based tweets) using a support vector machine (SVM) classifier for detection of a single event from a single input. However, existing approaches do not include a mechanism for understanding relevant images in an effort to visually quantify event characteristics. For instance, in the case of a destructive event, quantification of event characteristics may include damage assessment to physical structures.

Accordingly, existing approaches carry only limited information and are language specific. As such, a need exists to convert unstructured images to structured semantics, as trends in structured semantics over time can be used for trainable and extendable event detection.

SUMMARY

In one aspect of the present invention, techniques for social media event detection and content-based retrieval include obtaining multiple images from at least one social media source, extracting at least one visual semantic concept from the multiple images, differentiating an event semantic concept signal from a background semantic concept signal to detect an event in the multiple images, and retrieving one or more images associated with the event semantic concept signal for presentation as a visual description of the detected event.

In another aspect of the invention, techniques for detecting an event via social media content include obtaining multiple images from at least one social media source, extracting at least one visual semantic concept from the multiple images, differentiating an event semantic concept signal from a background semantic concept signal to detect an event in the multiple images, retrieving one or more images associated with the event semantic concept signal, grouping the one or more images associated with the event semantic concept signal, annotating the group of one or more images with user feedback, and displaying the annotated group of one or more images as a visual description of the detected event.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
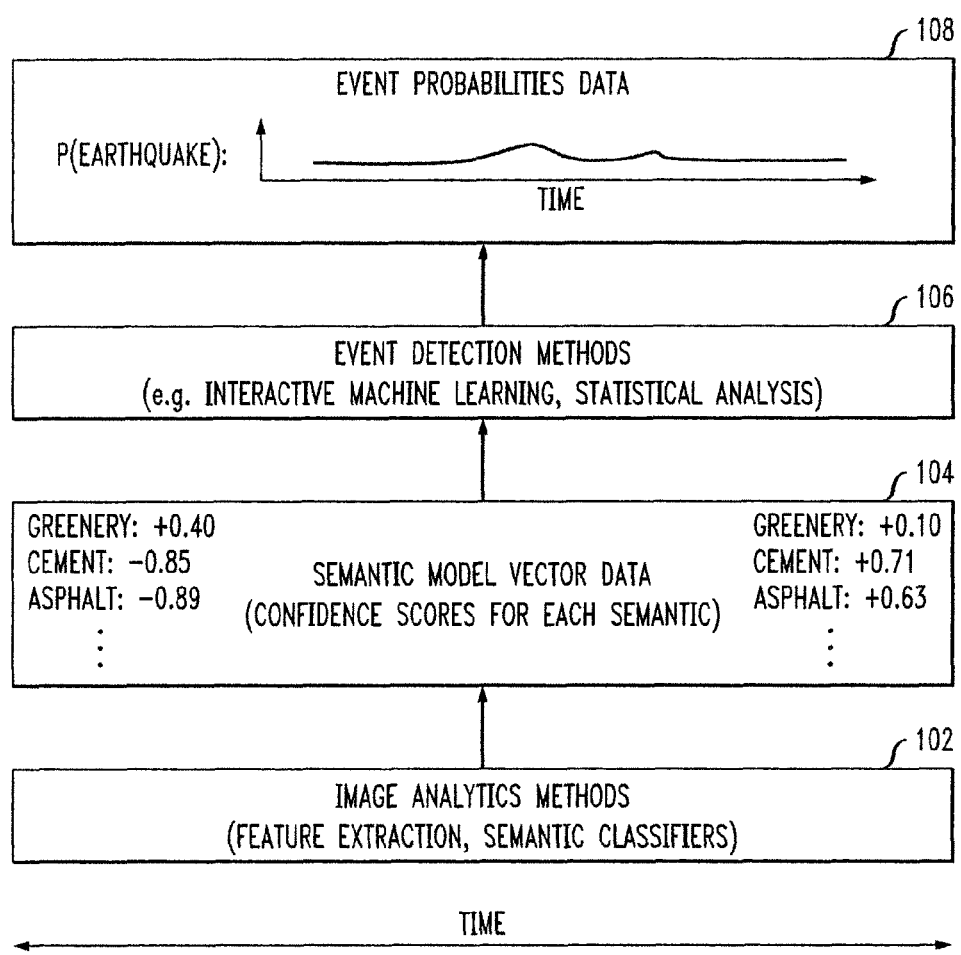
FIG. 1 is a diagram illustrating generating event probability data, according to an embodiment of the present invention.

As described herein, an aspect of the present invention includes social media event detection and content-based retrieval using time-resolved image semantic concepts. As used herein, an "event" can be considered an unplanned change in state that a user may have an interest in proactively detecting or retroactively retrieving. At least one embodiment of the invention includes detection of large scale social events by observing the change in image semantics over time. Additionally, at least one embodiment of the invention includes capturing and retrieving images that are relevant to a detected event. Example events can include a wide variety of actions such as a parade, an earthquake, a tornado, a sporting event, etc.

As detailed herein, at least one embodiment of the invention includes monitoring the semantics of images uploaded to one or more social media websites over time. In one example embodiment, images can be streamed to a parallel system which applies a set of generated semantic models (1,000 or more, for instance) to the images in real-time. Such semantics may include, for example, various types of scenes, objects, people, and various quantities of each. Additionally, background levels of semantic signals can be measured, and a certain deviation from the background levels can be considered an event. Images associated with the semantics, including the particular event signal, can further be grouped and presented as a representation of the event.

Monitored and extracted image semantics can include, as noted above, various types of scenes, objects and/or people. A standard set of semantic classifiers can be provided a priori, or a user can train his or her specialized set of semantic classifiers. In at least one embodiment of the invention, such image semantics are extracted directly from rich social media visual data, such as user-posted images or videos. Aspects of the invention additionally use this information to detect large-scale events directly from images and videos uploaded to social media streams. Unplanned changes in state (or "events," as used herein) for unconstrained regions such as a city, a district, a state, or nation, can be detected from changes in the image/video semantics over an unconstrained period of time.

In accordance with one or more embodiments of the invention, event detection can be performed using a variety of techniques. One example technique includes measuring the mean and standard deviation of semantics over a pre-determined or user-specified background time. The user can also set an outlier threshold for event detection. For example, the user might specify that an event occurs when the probability of the number of "rubble" photos uploaded during a given time, given the background time period, is less than 5%.

Also, in at least one embodiment of the invention, the user may specify both a background time period and an event time period. Background time periods can be considered periods of time that do not contain the characteristics of the event. An additional aspect of such an embodiment includes learning the differentiating characteristic image semantics that sufficiently discriminate an event from a non-event, facilitating detection of events similar to the specified event in the future. Learning such differentiating characteristic image semantics can be achieved, for example, by using all of the semantics as a feature from which to train a support vector machine (SVM) classifier, with images that characterize the event as positive examples and images that do not characterize the event as negative examples.

FIG. 1 is a diagram illustrating generating event probability data, according to an embodiment of the present invention. Step 102 includes performing image analytics, such as feature extraction, semantic classification, etc. Step 104 includes generating semantic model vector data. This step can include quantifying various contextual aspects of the image(s), such as the amount of greenery, cement and/or asphalt illustrated. In one example embodiment of the invention, this step can also include producing confidence scores for each semantic. Step 106 includes performing event detection, for example, by using interactive machine learning and/or statistical analysis. Additionally, step 108 includes generating event probabilities data.

Accordingly, the techniques depicted in FIG. 1 include streaming images from one or more social media websites through an image analytics system to extract semantic content. As noted in step 104, this can include representing the streamed data as semantic model vectors. Semantic model vectors are the concatenated outputs of all semantic classifiers in the form of a vector. By way of example, images from social media channels can be collected over time. During a background period of time for which an event of interest is not occurring (referred to herein as a Regular State), images and videos will have one particular statistical distribution of their semantic makeup. Example semantic model vector values can be, in at least one embodiment of the invention, averaged over all images collected within a timeframe $\Delta t$.

When an event of interest occurs (referred to herein as an Irregular State), the semantic makeup over a similarly long period of time will change according to the characteristics of the event. In an illustrative example of an earthquake, more images and videos containing buildings, asphalt and cement will likely be observed during this period of time.

As also depicted in FIG. 1, an aspect of the invention includes performing event detection over semantic signals to compute a probability that an event has occurred. An example embodiment of the invention can include statistical analysis. For instance, such analysis might include measurement of the mean and standard deviation of background "Regular State" semantics, and identification of periods of time that change more than a threshold number of standard deviations away from the mean of "Regular State" semantic signals.

As also noted, an example embodiment of the invention might also include implementing a supervised machine learning algorithm. For instance, a user can highlight a period of time in which no event of interest has occurred, and then highlight periods of time in which various events of interest have occurred. A machine learning algorithm can determine the distinction between each type of event semantics or lack of event semantics, and enable recognition of such events in the future based on the distinction. Similarly, a user may specify both a background time period and an event time period. The system can then learn the differentiating characteristic image semantics that sufficiently discriminate an event from a non-event, enabling the system to detect events similar to the specified event in the future.

Also, at least one embodiment of the invention can carry out event detection via SVM or k-nearest neighbor (kNN) on time intervals, or SVMs with sequence alignment kernels. This can be achieved, for example, by providing images that characterize the event as positive examples, and images that do not characterize the event as negative examples. Semantic model vectors can be extracted from all images, and these vectors can serve as features which are fed to an SVM component for training.

In addition, temporal information can be considered. Instead of using individual images as examples, sequences of image groups that may or may not be aggregated into single representations per group per region of time, can be provided in the form of several concatenated semantic model vectors in temporal order. These representations then serve as positive and negative examples, and can be used in conjunction with SVM kernels that consider sequence information. Such kernels include sequence alignment kernels using dynamic programming or bi-partite matching kernels. Further, a supervised machine learning algorithm can be implemented in conjunction with text-based event detection technologies to improve robustness of each approach. Additionally, an embodiment of the invention that implements a machine learning algorithm can also include assessing which images contributed most prominently to event detection as event-related.

Figure 2:
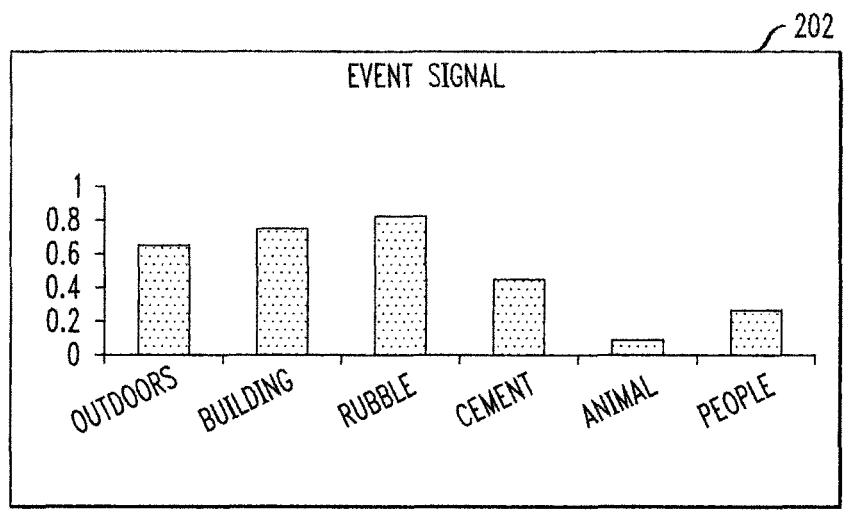
FIG. 2 is a diagram illustrating correlation data for images and semantics for representing an event, according to an embodiment of the present invention.
Figure 2:
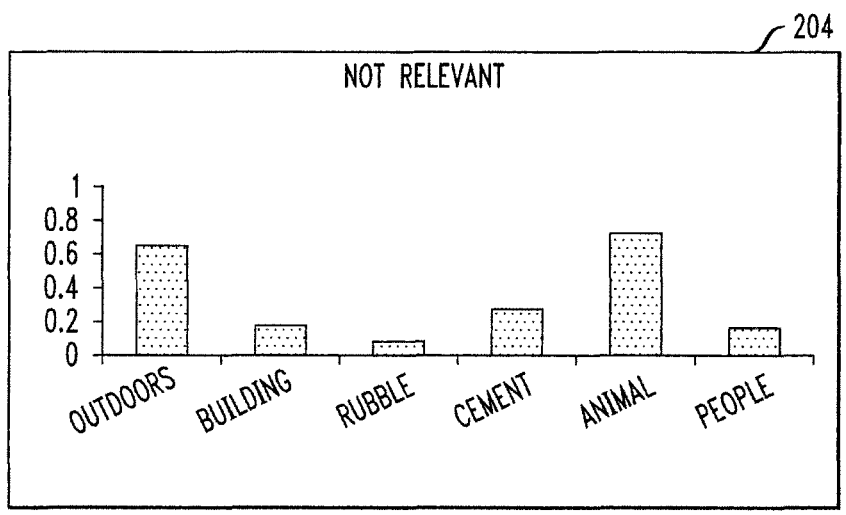
Figure 2:
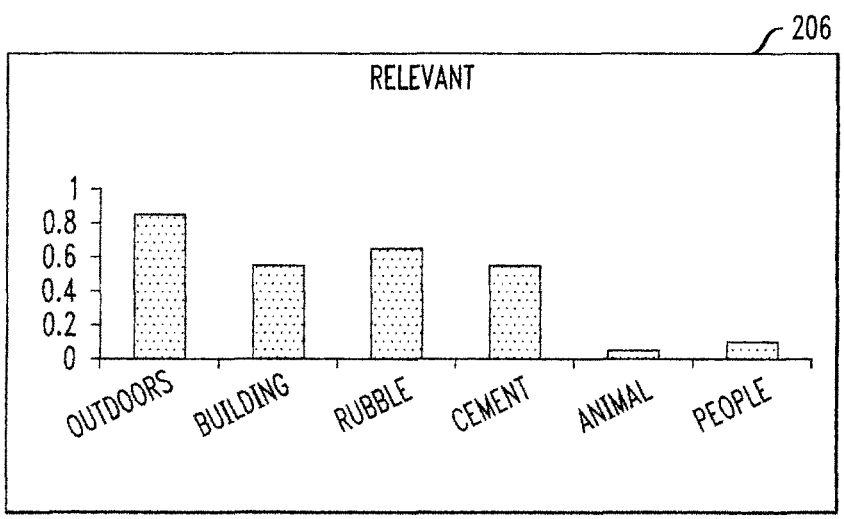

FIG. 2 is a diagram illustrating correlation data for images and semantics for representing an event, according to an example embodiment of the present invention. By way of illustration, FIG. 2 depicts data 202 pertaining to average semantic makeup of an example event signal, data 204 pertaining to whether example images might be considered not relevant to the event, and data 206 pertaining to whether example images might be considered relevant to the event.

Accordingly, as depicted in FIG. 2, at least one embodiment of the invention includes clustering and/or organizing images correlated to semantics that sufficiently represent an event as it unfolds. This can be performed, for example, by using a trained event model to score groups of images over time, and returning or highlighting those groups of images that produce the highest score(s). By way of example, this can include the implementation of an image retrieval system, where images with a semantic makeup similar to that of the event signal are retrieved for display to a user. The presentation can take on a variety of forms, such as placing relevant images on a map according to the locations where the images were acquired. This interface can provide the visual characteristics of the event, as well as the geographical information. Geographical information can be extracted from global positioning system (GPS) information in the image header and/or image localization algorithms based on visual characteristics. Images may also be shown without geographical information.

Similarly, in at least one embodiment of the invention, when an event is detected, additional relevant images and videos describing the event can be retrieved as a rich description of the event. For example, during an earthquake, an increase in the number of outdoor photos, including photos of streets, damaged roads, rubble, etc. will likely be observed. Images associated with those semantics that have characterized the event can be retrieved to provide a more detailed description of the event. Further, as noted, if the images are tagged with global positioning system (GPS) location information in the meta-data, at least one embodiment of the invention includes overlaying the images onto a map to give a geospatial representation of where the event occurred and the possible scope of influence and/or effect.

As also detailed herein, at least one embodiment of the invention includes operating as an open-domain for processing social media posted images or videos (for example, from Twitter, Facebook, etc.); that is, aspects of the invention are not limited to a pre-specified televised event, locality, or time. Instead, aspects of the invention include detecting unplanned events in the unconstrained spatio-temporal domain.

Figure 3:
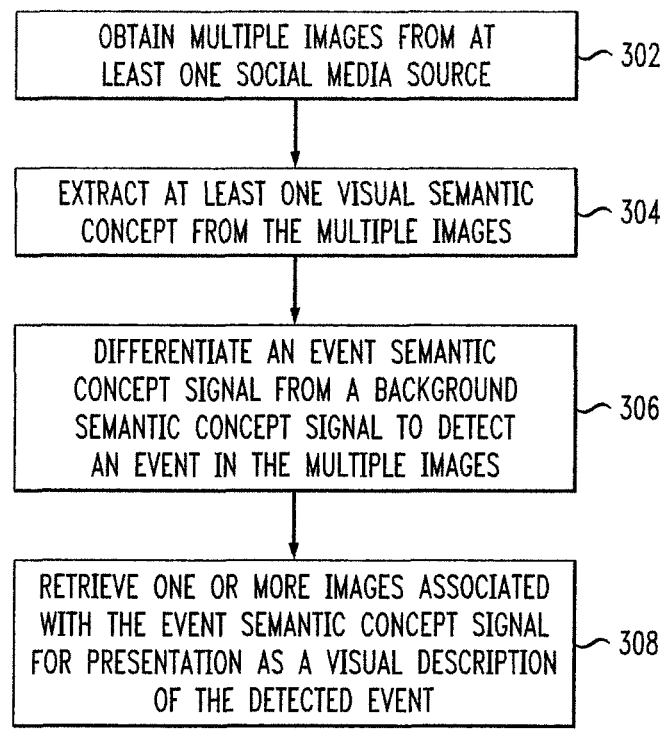
FIG. 3 is a flow diagram illustrating techniques for detecting an event via social media content, according to an embodiment of the invention.

FIG. 3 is a flow diagram illustrating techniques for detecting an event via social media content, according to an embodiment of the present invention. Step 302 includes obtaining multiple images from at least one social media source. The images can include images derived from photo and video input (for example, user-posted images or videos on at least one social media source). In at least one embodiment of the invention, the obtaining step includes streaming multiple images from at least one social media source in real-time. Step 304 includes extracting at least one visual semantic concept from the multiple images. As described herein, a visual semantic concept characterizes the event.

Step 306 includes differentiating an event semantic concept signal from a background semantic concept signal to detect an event in the multiple images. The differentiating step can be based, for example, on comparing signal strength of each of the at least one extracted visual semantic concept to a predetermined outlier threshold. Additionally, the differentiating step can include measuring a mean and standard deviation of each semantic concept over a user-specified background time period.

Further, in at least one embodiment of the invention, the differentiating step includes using an interactive machine learning algorithm, as well as, for example, assessing which of the multiple images contributed most prominently to event detection as event-related. Additionally, the differentiating step can include performing a statistical analysis to compute a probability that an event has occurred.

Step 308 includes retrieving one or more images associated with the event semantic concept signal for presentation as a visual description of the detected event. Additionally, the techniques depicted in FIG. 3 can include measuring the signal of each semantic concept over time, as well as identifying one or more semantic concept signal peaks that signify a real-time event.

At least one embodiment of the invention, as detailed herein, can also include overlaying images tagged with a GPS function onto a map to provide a geo-spatial representation of the event. Further, the techniques depicted in FIG. 3 can additionally include specifying a background time period and an event time period, streaming images to a parallel system which applies a set of generated semantic models to the images in real-time, and/or monitoring semantics of images uploaded to one or more social media websites over a specified time period. Also, additional images can be retrieved that are relevant to the detected event.

Figure 4:
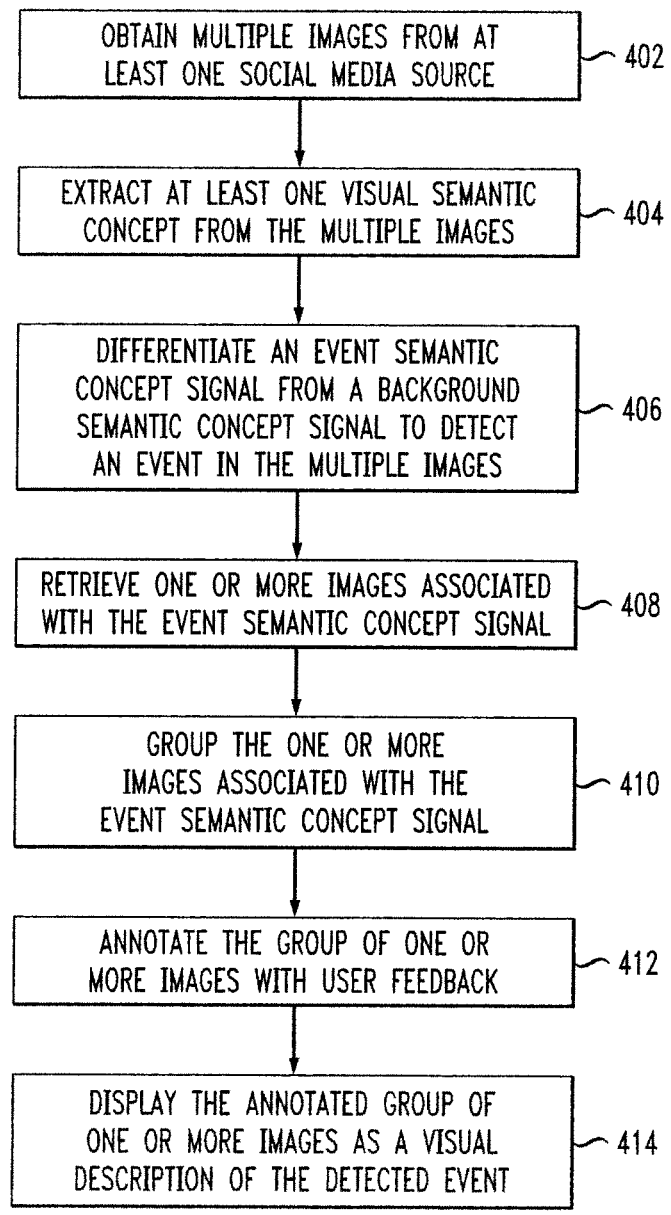
FIG. 4 is a flow diagram illustrating techniques for detecting an event via social media content, according to an embodiment of the invention.

FIG. 4 is a flow diagram illustrating techniques for detecting an event via social media content, according to an embodiment of the invention. Step 402 includes obtaining multiple images from at least one social media source. Step 404 includes extracting at least one visual semantic concept from the multiple images. Step 406 includes differentiating an event semantic concept signal from a background semantic concept signal to detect an event in the multiple images. Step 408 includes retrieving one or more images associated with the event semantic concept signal. Step 410 includes grouping the one or more images associated with the event semantic concept signal. Step 412 includes annotating the group of one or more images with user feedback. Step 414 includes displaying the annotated group of one or more images as a visual description of the detected event.

The techniques depicted in FIG. 3 and FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 and FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 5:
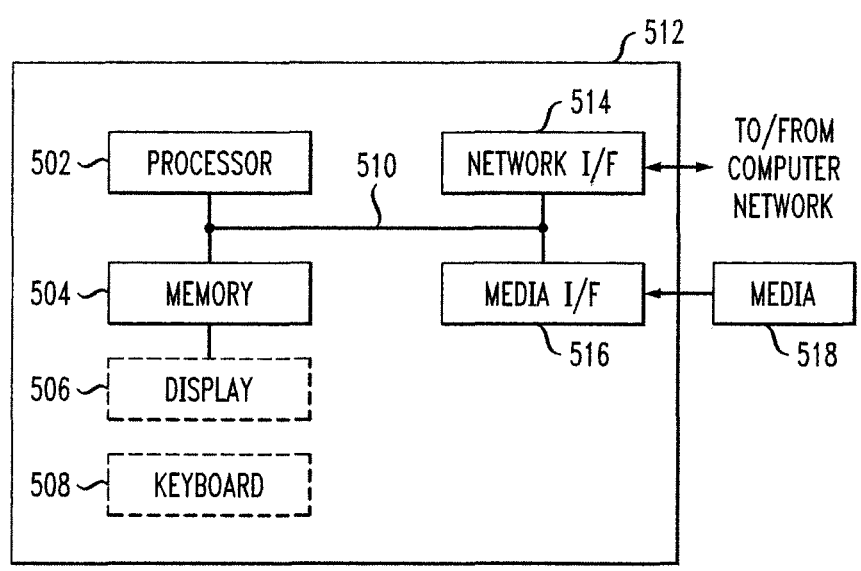
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory

504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, differentiating characteristic image semantics derived from social media content to detect events from non-events.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An article of manufacture comprising a non-transitory computer readable storage medium having computer readable instructions tangibly embodied thereon which, when implemented, cause a computer to carry out a plurality of method steps comprising:
   determining, during a period of time in which a given event is not occurring, a background visual semantic concept signal level comprising a statistical distribution of multiple visual semantic concepts across multiple images from at least one social media source;
   obtaining multiple images from at least one social media source;
   extracting at least one visual semantic concept from the multiple additional images;
   measuring the deviation of a signal level of the at least one visual semantic concept from the background visual semantic concept signal level to detect the occurrence of the given event in the multiple additional images, wherein a measured deviation of the signal level of the at least one visual semantic concept from the background semantic concept signal level that is above a predetermined threshold corresponds to the occurrence of the given event; and
   retrieving one or more images associated with one or more predetermined characteristics Of the given event for presentation as a visual description of the detected occurrence of the given event.

2. The article of manufacture of claim 1, wherein the multiple images from at least one social media source comprise images derived from photo and/or video input.

3. The article of manufacture of claim 2, wherein the photo and/or video input comprises user-posted images and/or videos on at least one social media source.

4. The article of manufacture of claim 1, wherein said obtaining comprises streaming multiple images from at least one social media source in real-time.

5. The article of manufacture of claim 1, wherein the at least one visual semantic concept characterizes an event.

6. The article of manufacture of claim 1, wherein said measuring comprises measuring a mean and standard deviation of each semantic concept over a user-specified background time period.

7. The article of manufacture of claim 1, wherein said measuring comprises using an interactive machine learning algorithm.

8. The article of manufacture of claim 1, wherein said measuring comprises performing a statistical analysis to compute a probability that the given event has occurred.

9. The article of manufacture of claim 1, wherein the method steps comprise:
   measuring the signal of each semantic concept over time.

10. The article of manufacture of claim 1, wherein the method steps comprise:
    identifying one or more semantic concept signal peaks that signify a real-time event.

11. The article of manufacture of claim 1, wherein the method steps comprise:
    overlaying images annotated with a global position system (GPS) function onto a map to provide a geo-spatial representation of the event.

12. The article of manufacture of claim 1, wherein the method steps comprise:
    retrieving one or more additional images that are relevant to a detected event.

13. The article of manufacture of claim 1, wherein the method steps comprise:
    monitoring semantics of images uploaded to one or more social media websites over a specified time period; and
    streaming images to a parallel system which applies a set of generated semantic models to the images in real-time.

14. The article of manufacture of claim 1, wherein the method steps comprise:
    specifying a background time period and an event time period.

15. A system for detecting an event via social media content, comprising:
    a memory; and
    at least one processor coupled to the memory and operative for:
       determining, during a period of time in which a given event is not occurring, a background visual semantic concept signal level comprising a statistical distribution of multiple visual semantic concepts across multiple images from at least one social media source;
       obtaining multiple images from at least one social media source;
       extracting at least one of the multiple visual semantic concept from the multiple additional images;
       measuring the deviation of signal level of the at least one visual semantic concept from the background visual semantic concept signal level to detect the occurrence of the given event in the multiple additional images, wherein the measured deviation of the signal level of the at least one visual semantic concept from the background semantic concept signal level that is above a predetermined threshold corresponds to the occurrence of the given event; and
       retrieving one or more images associated with one or more predetermined characteristics of the given event for presentation as a visual description of the detected occurrence of the given event.

\* \* \* \* \*